US012743301B2

(12) United States Patent
Kim et al.

(10) Patent No.: US 12,743,301 B2
(45) Date of Patent: Sep. 22, 2026

(54) TIERED SIMULTANEOUS CORE

(71) Applicant: Boost SubscriberCo L.L.C., Englewood, CO (US)

(72) Inventors: In-Kyung Kim, Highlands Ranch, CO (US); Sougata Saha, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 427 days.

(21) Appl. No.: 18/460,854

(22) Filed: Sep. 5, 2023

(65) Prior Publication Data

US 2025/0077271 A1 Mar. 6, 2025

(51) Int. Cl.
*G06F 9/48* (2006.01)

(52) U.S. Cl.
CPC .................................... *G06F 9/485* (2013.01)

(58) Field of Classification Search
CPC ......... G06F 9/485; H04L 41/16; H04L 41/40; H04L 41/22; H04L 12/1403; H04L 63/0853; H04L 12/1464; H04L 12/4633; H04L 12/1407; H04L 63/08; H04L 9/32; H04L 1/0071; H04L 43/04; H04L 63/0428; H04L 63/0876; H04L 65/1066; H04L 67/04; H04L 67/535; H04L 67/75; H04L 65/1016; H04L 65/1063; H04L 65/611; H04L 65/65; H04W 28/0846; H04W 88/06; H04W 48/18; H04W 8/183; H04W 60/005; H04W 12/06; H04W 60/04; H04W 8/205; H04W 76/27; H04W 4/24; H04W 12/35; H04W 4/50; H04W 8/20; H04W 36/00; H04W 48/08; H04W 76/16; H04W 12/42; H04W 48/16; H04W 8/18; H04W 84/12; H04W 88/02; H04W 88/16; H04W 4/60; H04W 60/00; H04W 36/1446;

(Continued)

(56) References Cited

U.S. PATENT DOCUMENTS

| | | | | |
|---|---|---|---|---|
| 11,374,821 B2 | 6/2022 | Xu et al. | | |
| 2009/0016302 A1 * | 1/2009 | Shaheen | ........... H04W 36/0022 | 370/331 |

(Continued)

FOREIGN PATENT DOCUMENTS

| | | | |
|---|---|---|---|
| EP | 3493649 A1 | 6/2019 | |
| WO | 2020053889 A1 | 3/2020 | |
| WO | 2023026541 A1 | 3/2023 | |

OTHER PUBLICATIONS

Wikipedia 5G Network Slicing Article available at https://en.wikipedia.org/wiki/5G_network_slicing (last accessed Aug. 9, 2023).

*Primary Examiner* — Nimesh Patel
(74) *Attorney, Agent, or Firm* — Kilpatrick Townsend & Stockton LLP

(57) ABSTRACT

A tiered simultaneous core that uses private core(s) and carrier (public) core(s) in coordination with one another is disclosed. The system can use network capabilities and intelligently select how to use one or more private cores and one or more public cores together, coordinating between the networks using tiered use. In other words, use of the private core(s) and the public core(s) is divided into tiers. These tiers may be associated with a user or entity (e.g., a corporation, a government organization, etc.), an application, a type of data transfer, a priority, etc.

20 Claims, 13 Drawing Sheets

(58) Field of Classification Search
CPC ....... H04W 68/12; H04W 72/51; H04W 8/22; H04W 8/24; H04W 84/042; H04W 88/04; H04W 12/03; H04W 12/40; H04W 12/45; H04W 16/14; H04W 28/06; H04W 36/0022; H04W 36/00222; H04W 36/385; H04W 52/0206; H04W 72/04; H04W 76/36; H04W 12/43; H04W 16/10; H04W 28/26; H04W 36/00226; H04W 36/14; H04W 4/70; H04W 48/20; H04W 76/15; H04W 84/045; H04W 84/105; H04W 92/02; H04M 17/103; H04M 15/8033; H04M 15/61; H04M 15/66; H04M 3/42314; H04M 7/006; H04M 3/42246; Y02D 30/70
See application file for complete search history.

(56) References Cited

U.S. PATENT DOCUMENTS

| | | | | |
|---|---|---|---|---|
| 2020/0100309 | A1* | 3/2020 | Jha | H04W 36/00226 |
| 2021/0243676 | A1* | 8/2021 | Files | H04W 48/06 |
| 2022/0110177 | A1* | 4/2022 | Choksi | H04W 76/16 |
| 2022/0240330 | A1* | 7/2022 | Xiang | H04W 28/0867 |
| 2023/0156547 | A1* | 5/2023 | Lei | H04W 36/14<br>455/434 |
| 2023/0189188 | A1* | 6/2023 | Zhu | H04W 40/02<br>455/435.1 |
| 2024/0373334 | A1* | 11/2024 | Ueura | H04W 48/18 |
| 2025/0081045 | A1* | 3/2025 | Kim | H04W 28/26 |
| 2025/0192865 | A1* | 6/2025 | Ferrante | G06N 3/098 |

* cited by examiner

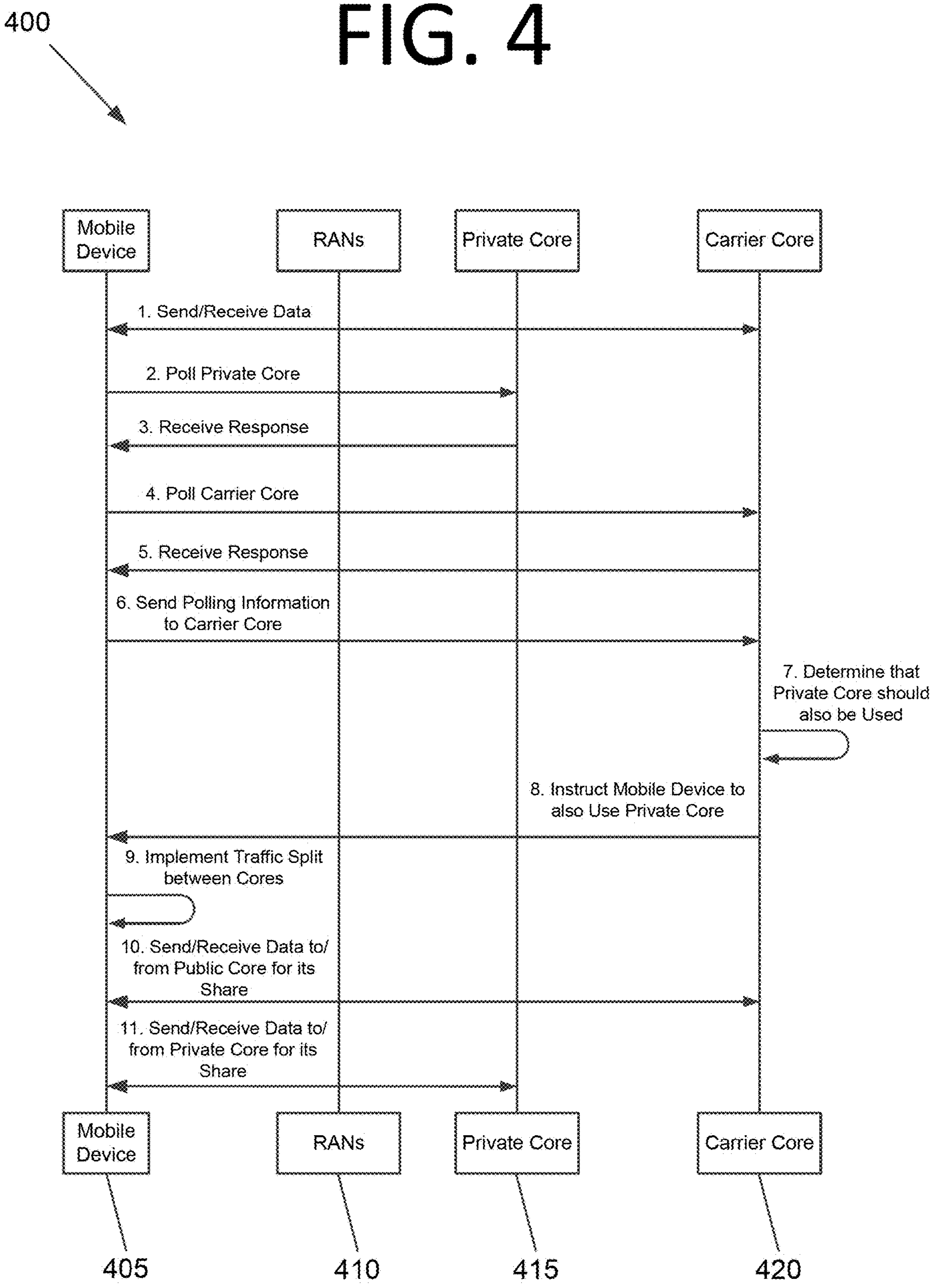

FIG. 4

Mobile Device

RANs

Private Core

Carrier Core

1. Send/Receive Data

2. Poll Private Core

3. Receive Response

4. Poll Carrier Core

5. Receive Response

6. Send Polling Information to Carrier Core

7. Determine that Private Core should also be Used

8. Instruct Mobile Device to also Use Private Core

9. Implement Traffic Split between Cores

10. Send/Receive Data to/ from Public Core for its Share

11. Send/Receive Data to/ from Private Core for its Share

Mobile Device

RANs

Private Core

Carrier Core

405

410

415

420

600

Mobile Device
RANs
Private Core
Carrier Core

1. Send/Receive Data
2. Poll Private Core
3. Receive Response
4. Poll Carrier Core
5. Receive Response
6. Determine Application Requires Private Core
7. Switch to Private Core for Application
8. Send/Receive Application Data via Private Core
9. Send/Receive Other Data via Public Core Mobile Device
RANs
Private Core
Carrier Core 605
610
615
620

900
Available Core Data
Connection Data
Congestion Data
Application Data
910
Train AI/ML Model
920
Review Results
930
Threshold Met?
940
NO
Supplement Training Data and/ or Modify Reward Function
950
YES
Test on Evaluation Data
960
Threshold Met?
970
NO
YES
Deploy AI/ML Model
980

1000

Display
1025
Keyboard
1030
Cursor
Control
Device
1035
Communication
Device
1020
Processor(s)
1010
Bus
1005
1040
1045
1050
Operating
System
Tiered
Simultaneous Core
Module
Other Functional
Modules
Memory 1015

1200
START
Configure Initial Core Setup
1210
Simultaneously Use Cores from Configuration
1220
Obtain Polling Data
1230
Determine Condition Change and Send SIM Message to Carrier
1240
Determine that Core Assignment should be Changed
1250
Assign Core(s)
1260
Use New Core Assignment
1270

TIERED SIMULTANEOUS CORE

FIELD

The present invention generally relates to communications, and more specifically, to a tiered simultaneous core that uses private core(s) and carrier (public) core(s) in coordination with one another.

BACKGROUND

Private cores provide wireless communication services to private customers. For instance, private cores may include servers, radio access networks (RANs), etc. that a customer owns and maintains at a site, such as an office, a warehouse, a factory, or the like. Public cores are networks owned and operated by carriers, such as DISH®, AT&T©, T-Mobile®, and Verizon®.

5G network slicing is a network architecture that enables the multiplexing of virtualized and independent logical networks on the same physical network infrastructure. Each network slice is an isolated end-to-end network tailored to fulfil requirements requested by a particular application. For this reason, this technology assumes a central role to support 5G mobile networks that are designed to efficiently embrace a plethora of services with different service level requirements (SLRs). The realization of this service-oriented view of the network leverages on the concepts of software-defined networking (SDN) and network function virtualization (NFV) that allow the implementation of flexible and scalable network slices on top of a common network infrastructure.

However, intelligent communication between private cores and public cores is not currently performed. In other words, private cores and public cores do not currently coordinate network traffic with one another, nor do they perform any slicing or tiering operations. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to a tiered simultaneous core that uses private core(s) and carrier (public) core(s) in coordination with one another.

In an embodiment, one or more servers of a public core include memory storing computer program instructions for tiered simultaneous core management for mobile devices and at least one processor configured to execute the computer program instructions. The computer program instructions are configured to cause the at least one processor to determine that a core assignment for a mobile device or an application running on the mobile device should be modified from among a plurality of cores. The plurality of cores include one or more public cores, one or more private cores, or both. The computer program instructions are also configured to cause the at least one processor to assign one or more cores of the plurality of cores to the mobile device or the application based on network characteristics of the plurality of cores, a subscription of the mobile device, or both. The computer program instructions are further configured to cause the at least one processor to instruct the mobile device to switch the core assignment for the application or the mobile device to the assigned one or more cores. The assignment of the one or more cores of the plurality of cores is made by the one or more servers based at least in part on a service tier associated with a user or entity of the mobile device, the application, a type of data transfer, or a priority.

In another embodiment, one or more non-transitory computer-readable media store one or more computer programs for tiered simultaneous core management for mobile devices. The one or more computer programs are configured to cause at least one processor to determine that a core assignment for a mobile device or an application running on the mobile device should be modified from among a plurality of cores. The plurality of cores include one or more public cores, one or more private cores, or both. The one or more computer programs are also configured to cause the at least one processor to assign one or more cores of the plurality of cores to the mobile device or the application. The one or more computer programs are further configured to cause the at least one processor to instruct the mobile device to switch the core assignment for the application or the mobile device to the assigned one or more cores. The assignment of the one or more cores of the plurality of cores is made by the one or more servers based at least in part on a service tier associated with a user or entity of the mobile device, the application, a type of data transfer, or a priority.

In yet another embodiment, a computer-implemented method for performing tiered simultaneous core management for mobile devices includes determining, by one or more servers, that a core assignment for a mobile device or an application running on the mobile device should be modified from among a plurality of cores. The plurality of cores include one or more public cores, one or more private cores, or both. The computer-implemented method also includes assigning one or more cores of the plurality of cores to the mobile device or the application, by one or more servers, based on network characteristics of the plurality of cores, a subscription of the mobile device, or both. The computer-implemented method further includes instructing the mobile device, by one or more servers, to switch the core assignment for the application or the mobile device to the assigned one or more cores. The assignment of the one or more cores of the plurality of cores is made by the one or more servers based at least in part on a service tier associated with a user or entity of the mobile device, the application, a type of data transfer, or a priority. The assignment of the one or more cores of the plurality of cores is made by the one or more servers using one or more AI/ML models that have been trained to learn network characteristics of the plurality of cores.

In still another embodiment, a mobile device includes memory storing computer program instructions for tiered simultaneous core management and at least one processor configured to execute the computer program instructions. The computer program instructions are configured to cause the at least one processor to configure the mobile device, an application running on the mobile device, or both, for a plurality of cores based at least in part on a service tier associated with a user or entity of the mobile device, the application, a type of data transfer, or a priority. The plurality of cores include one or more public cores, one or more private cores, or both. The computer program instructions are also configured to cause the at least one processor to simultaneously use the plurality of cores from the configuration.

In another embodiment, a non-transitory computer-readable medium stores a computer program for tiered simultaneous core management for a mobile device. The computer program is configured to cause at least one processor to configure the mobile device, an application running on the mobile device, or both, for a plurality of cores based at least in part on a service tier associated with a user or entity of the mobile device, the application, a type of data transfer, or a priority. The plurality of cores include one or more public cores, one or more private cores, or both. The computer program is also configured to cause the at least one processor to simultaneously use the plurality of cores from the configuration. The computer program is further configured to cause the at least one processor to determine that a core assignment for the mobile device or the application running on the mobile device should be modified from among the plurality of cores. Additionally, the computer program is configured to cause the at least one processor to assign one or more cores of the plurality of cores to the mobile device or the application and use the assigned one or more cores for communication by the mobile device or the application.

In yet another embodiment, a computer-implemented method for tiered simultaneous core management for a mobile device includes configuring the mobile device, an application running on the mobile device, or both, for a plurality of cores based at least in part on a service tier associated with a user or entity of the mobile device, the application, a type of data transfer, or a priority, by the mobile device. The plurality of cores include one or more public cores, one or more private cores, or both. The computer-implemented method also includes simultaneously using the plurality of cores from the configuration, by the mobile device. The computer-implemented method further includes determining, by the mobile device, that a core assignment for the mobile device or the application running on the mobile device should be modified from among the plurality of cores. Additionally, the computer-implemented method includes assigning, by the mobile device, one or more cores of the plurality of cores to the mobile device or the application and using, by the mobile device, the assigned one or more cores for communication by the mobile device or the application. The assignment of the one or more cores of the plurality of cores is made at least in part by the mobile device using one or more artificial intelligence (AI)/machine learning (ML) models that have been trained to learn network characteristics of the plurality of cores.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a flow diagram illustrating a process for managing communications between a mobile device, a private core, and a carrier core, according to an embodiment of the present invention.

Unless otherwise indicated, similar reference characters denote corresponding features consistently throughout the attached drawings.

DETAILED DESCRIPTION OF THE EMBODIMENTS

Figure 1:
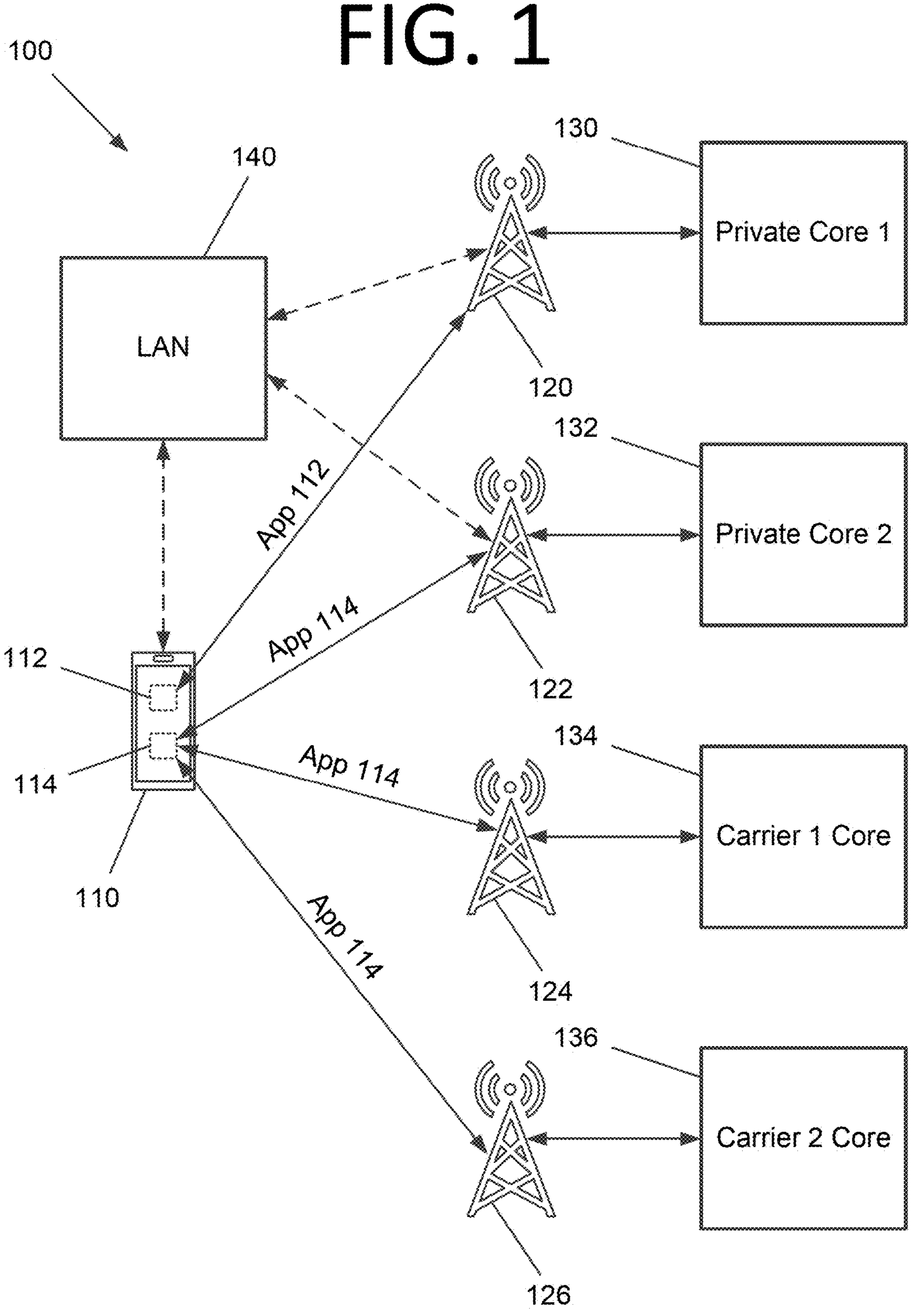
FIG. 1 is an architectural diagram illustrating a wireless communications system with public and private multiple cores, according to an embodiment of the present invention.

Some embodiments pertain to a tiered simultaneous core that uses private core(s) and carrier (public) core(s) in coordination with one another. A public network is a type of network where the general public (including individuals, corporate entities, government entities, etc.) has access to the public network. Through the public network (including the public network core), users can connect to other networks and/or the Internet. This is in contrast to a private network, where restrictions and access rules are established in order to relegate access (e.g., to corporate or government employees, a subset thereof, etc.). A private network can be considered to be a logically discrete cellular network with dedicated network elements that can include operating functions, infrastructure, and/or spectrum, that is customized to meet the needs of a customer or user groups. Multiple private cores may be connected through a local area network (LAN) in some embodiments. The LAN may serve to carry traffic between these private cores.

Both the private core(s) and the public core(s) may be configured for and facilitate fifth generation (5G) communications in some embodiments. Network procedures and protocols may intelligently divide processing throughput among cores based on factors such as capacity, bit rate, security, latency, location, throughput, call quality (drop), etc. Such network procedures and protocols allow provision of a specific quality of service (QoS) targeted to a group of users. When the capabilities of a core do not support user requirements, for example, a simultaneous core connection can be utilized.

The system can use network capabilities and intelligently select how to use one or more private cores and one or more public cores together, coordinating between the networks using tiered use. In other words, use of the private core(s) and the public core(s) is divided into tiers. These tiers may be associated with a user or entity (e.g., a corporation, a government organization, etc.), an application, a type of data transfer, a priority, etc. For example, in some embodiments, enterprise services may be assigned to the private core(s) and non-enterprise services or personal applications may be assigned to the public core(s). In certain embodiments, mobile devices or computing systems of a public core or a private core may cause the mobile device to switch between the available cores or use multiple cores simultaneously to improve throughput and efficiency. Mobile device users may be placed in core(s) (whether public or private) depending on the user's subscription in some embodiments.

In some embodiments, per the above, cores for applications may be assigned depending on the application type, bandwidth requirements, security requirements, etc. The assigning of the application to a given core can be static (i.e., the application always uses certain public or private core(s)) or dynamic (i.e., the application will be assigned to core(s) based on certain potentially changing criteria, such as congestion, availability, quality of service (QoS), signal strength, time of day, etc.). In some embodiments, the assignment of the core for the mobile device and/or its applications may be made by or aided by artificial intelligence (AI)/machine learning (ML) model(s), which may learn to intelligently monitor and predict core network characteristics. These characteristics may be learned over time. For instance, deterministic logic rules may be used initially for selecting the public core(s) and the private core(s), and these may be supplemented by or replaced with the probabilistic AI/ML model(s) as the models are trained over time based on core performance data and other criteria (e.g., learning to scour the Internet to find upcoming high congestion events such as concerts, sporting events, festivals, and the like, as well as their dates and times).

Different applications may have different quality requirements. For instance, some applications (e.g., video conferencing applications, streaming applications, certain video games, etc.) may have high bandwidth requirements that require a relatively high speed core or can benefit from splitting traffic among multiple cores simultaneously. Some applications may have heightened security requirements, and a user or entity associated with the mobile device may desire for all communications from that application, or certain types of communications from that application, to pass through their own core(s). For instance, if a customer does not want data for an application to be transmitted over a core that the customer does not own, the traffic for that application could be routed through designated private core (s) and other non-sensitive traffic could be routed based on whichever core has sufficient or the best characteristics. Highly sensitive data may be routed through a highly secured private core to ensure that the data is adequately protected.

In some embodiments, dual subscriber identity module (SIM) dual standby (DSDS) functionality may be used by a mobile device (e.g., a cell phone, a tablet, a laptop computer, etc.) for a pair of public cores, a pair of private cores, or a public core and a private core, splitting traffic on a per-SIM basis. DSDS may provide multi-subscription communication services on more than one SIM via respective radio access networks (RANs) for the cores assigned to the SIMs. For instance, voice traffic and Internet Protocol (IP) multimedia subsystem (IMS) traffic may be handled for a SIM on one core and data traffic may be handled for another SIM on another core.

If one network gets better over time, a SIM message may be sent on a band (e.g., 5G band N77, N48, etc., depending on the carrier) for a public core or a private core to modify which network(s) are used for various communications by the mobile device. Both the private RAN and the public RAN transmit in 5G bands in this embodiment. In certain embodiments, the private core may allow customers to latch onto the 5G spectrum using Wi-Fi.

The 3$^{rd}$ Generation Partnership Project (3GPP) has a specification called licensed assisted access (LAA). This specification allows a 3GPP long term extension (LTE) system to use the Wi-Fi spectrum (5 gigahertz (GHz)). In other words, the 5 GHz unlicensed spectrum can be shared with LTE and Wi-Fi. However, there is no provision for Wi-Fi to use the 5G spectrum (licensed spectrum). 3GPP also has a provision to allow 5G to use the unlicensed spectrum, called 5G New Radio Unlicensed (NR-U).

Consider the case where a given public core has a 10 gigabit (Gb) per second backhaul. If this backhaul is nearing its capacity, traffic from some users may be switched to one or more private core networks available to these users, or to another public core. In this manner, throughput may be improved or guaranteed by taking advantage of multiple cores (e.g., to meet subscription tier QoS requirements).

Per the above, in some embodiments, the selection of core(s) for certain traffic may be application specific. For instance, if a user of a mobile device is using an audio and video streaming application that requires a certain minimum data throughput, the core for this traffic may be selected to ensure that the minimum requirements can be met. A private core may not always be able to provide these capabilities, and the carrier network public core(s) may be used to ensure sufficient bit rates. Cores may be located at the edge of the network for low latency in some embodiments.

Mobile devices may be setup for the desired public and private cores. The mobile device may poll connections with the cores to make sure they are available, and change the core(s) that are used for services when a core that was being used is no longer available. Ping tests, signal strength analysis, etc. may be performed to determine the quality of service (QoS) for each core. If the QoS for a core falls below a certain data rate required by an application or for a service, for instance, the mobile device may switch cores for that application or service.

FIG. 1 is an architectural diagram illustrating a wireless communications system 100 with multiple public and private cores, according to an embodiment of the present invention. A mobile device 110 is running a pair of applications 112, 114. Wireless communications system 100 includes a pair of private cores 130, 132 and a pair of carrier (public) cores 134, 136 in this embodiment with respective radio access networks (RANs) 120, 122, 124, 126. However, any desired number of cores of either type may be used without deviating from the scope of the invention. Mobile device 110 may also communicate via LAN 140 in this embodiment, which is operably connected to private cores 130, 132 via RANs 120, 122, respectively. In some embodiments, mobile device 110, computing systems of RANs 120, 122, 124, 126, and/or computing systems of cores 130, 132, 134, 136 may be computing system 1000 of FIG. 10.

Different applications may use different cores, per the above. For instance, in this example, application 112 may have high security requirements and be assigned only to private core 130. Application 114, on the other hand, may have high bandwidth requirements and utilize private core 132, carrier core 134, and carrier core 136 to ensure high bandwidth and/or to reduce the burden on each individual core. Alternatively, application 114 may have some functions for which a private core is preferred and other functions for which a carrier (public) core is preferred. For instance, sensitive information, when transmitted and/or received by application 114, may be sent/received via private core 132. However, non-sensitive information may be sent/received via carrier cores 134, 136.

In some embodiments, mobile device 110 may use multiple or all of private cores 130, 132 and/or public cores 134, 136 depending on the overall bandwidth needs of mobile device 110, its subscription, etc. Cores 130, 132, 134, 136 may be intelligently provisioned for mobile device 110 depending on their respective network characteristics. For instance, the portions of communications sent through one or more of cores 130, 132, 134, 136 may be adjusted based on certain criteria, such a core congestion, the subscription associated with mobile device 110, costs associated with using each core, etc.

Carrier cores 134, 136 may include computing systems and other equipment associated with pass-through edge data centers (PEDCs) or breakout edge data centers (BEDCs) in some embodiments to provide lower latency. Carrier cores may be configured to communicate with regional data centers (RDCs), national data centers (NDCs), etc. as well. The carrier networks may provide various network functions (NFs) and other services. For instance, BEDCs may break out User Plane Function (UPF) data traffic (UPF-d) and provide cloud computing resources and cached content to mobile device 110, such as providing NF application services for gaming, enterprise applications, etc. RDCs may provide core network functions, such as UPF for voice traffic (UPF-v) and Short Message Service Function (SMSF) functionality. NDCs may provide a Unified Data Repository (UDR) and user verification services, for example. Other network services that may be provided may include, but are not limited to, IMS+telephone answering service (TAS) functionality, IP-SM gateway (IP-SM-GW) functionality (the network functionality that provides the messaging service in the IMS network), enhanced serving mobile location center (E-SMLC) functionality, policy and charging rules function (PCRF) functionality, mobility management entity (MME) functionality, signaling gateway (SGW) control plane (SGW-C) and user data plane (SGW-U) ingress and egress point functionality, packet data network gateway (PGW) control plane (PGW-C) and user data plane (PGW-U) ingress and egress point functionality, home subscriber server (HSS) functionality, UPF+PGW-U functionality, access and mobility management (AMF) functionality, HSS+unified data management (UDM) functionality, session management function (SMF)+PGW-C functionality, short message service center (SMSC) functionality, and/or policy control function (PCF) functionality. It should be noted that additional and/or different network functionality may be provided without deviating from the present invention. The various functions in these systems may be performed using dockerized clusters in some embodiments.

Figure 2:
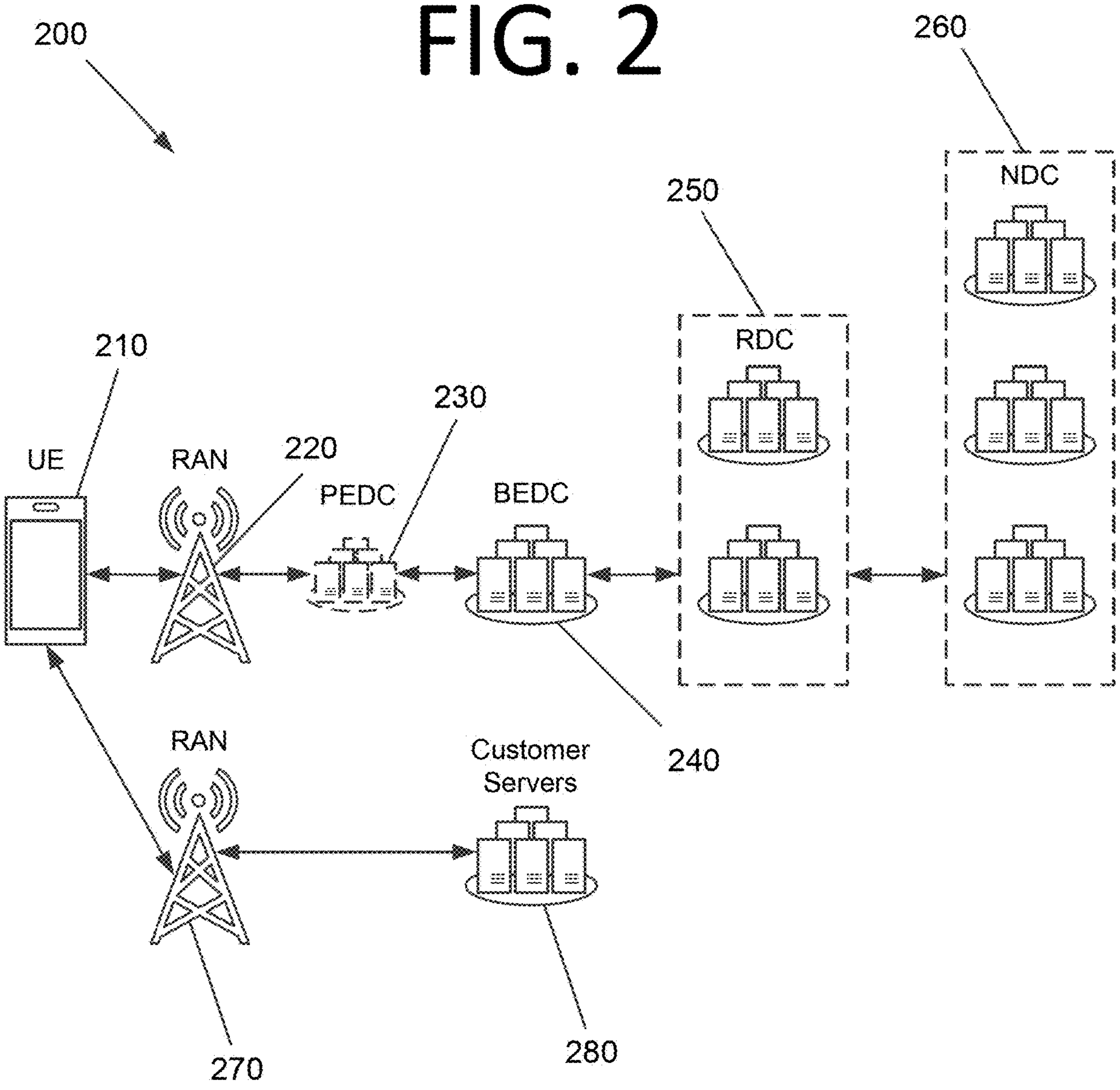
FIG. 2 is an architectural diagram illustrating a wireless communications system including a carrier network and a private core network, according to an embodiment of the present invention.

FIG. 2 is an architectural diagram illustrating a wireless communications system 200 including a carrier network and a private core network, according to an embodiment of the present invention. User equipment (UE) 210 (e.g., a mobile phone, a tablet, a laptop computer, etc.) communicates with RANs 220, 270 of the public core and the private core, respectively. RAN 220 passes public core communications to UE 210 and sends communications from UE 210 further into the carrier network. In some embodiments, communications are sent to/from RAN 220 via a PDC 230. However, in some embodiments, RAN 220 communicates directly with BEDC 240. BEDCs are typically smaller data centers that are proximate to the populations they serve. BEDCs may break out UPF-d and provide cloud computing resources and cached content to UE 210, such as providing NF application services for gaming, enterprise applications, etc.

BEDC 240 may utilize other data centers for NF authentication services. RDC 250 receives NF authentication requests from BEDC 240. RDC 250 may provide core network functions, such as UPF-v and SMSF. This helps with managing user traffic latency, for instance. However, RDC 250 may not perform NF authentication in some embodiments.

From RDC 250, NF authentication requests may be sent to NDC 260, which may be located far away from UE 210, RAN 220, PEDC 230, BEDC 240, and RDC 250. NDC 260 may provide a UDR, and user verification may be performed at NDC 260. UPF-d, UPF-v, SMSF, UDR, and user verification may be performed by dockerized computing clusters. Once the user of UE 210 is verified and authorized hardware is confirmed via NDC 260, NF authentication is completed by UE 210 and the NF is authorized. UE 210 is then able to access and use the respective application or service via PEDC 230 or BEDC 240.

Wireless communications system 200 also includes RAN 270, per the above, which facilitates communications between UE 210 and customer servers 280 (i.e., the private core). In some embodiments, mobile device 210 and/or computing systems of RANs 220, 270, PEDC 230, BEDC 240, RDC 250, NDC 260, and/or customer servers 280 may be computing system 1000 of FIG. 10. Customer servers 280 may be local servers accessible by a LAN and/or remove servers (e.g., servers of a customer server farm and/or cloud servers). Mobile device 210 may send communications for a given application through RAN 220, PEDC 230, and BEDC 240, through RAN 270 and customer servers 280, or both, depending on application requirements and/or mobile device requirements based on a subscription, bandwidth that mobile device 210 is currently using, etc.

Figure 3:
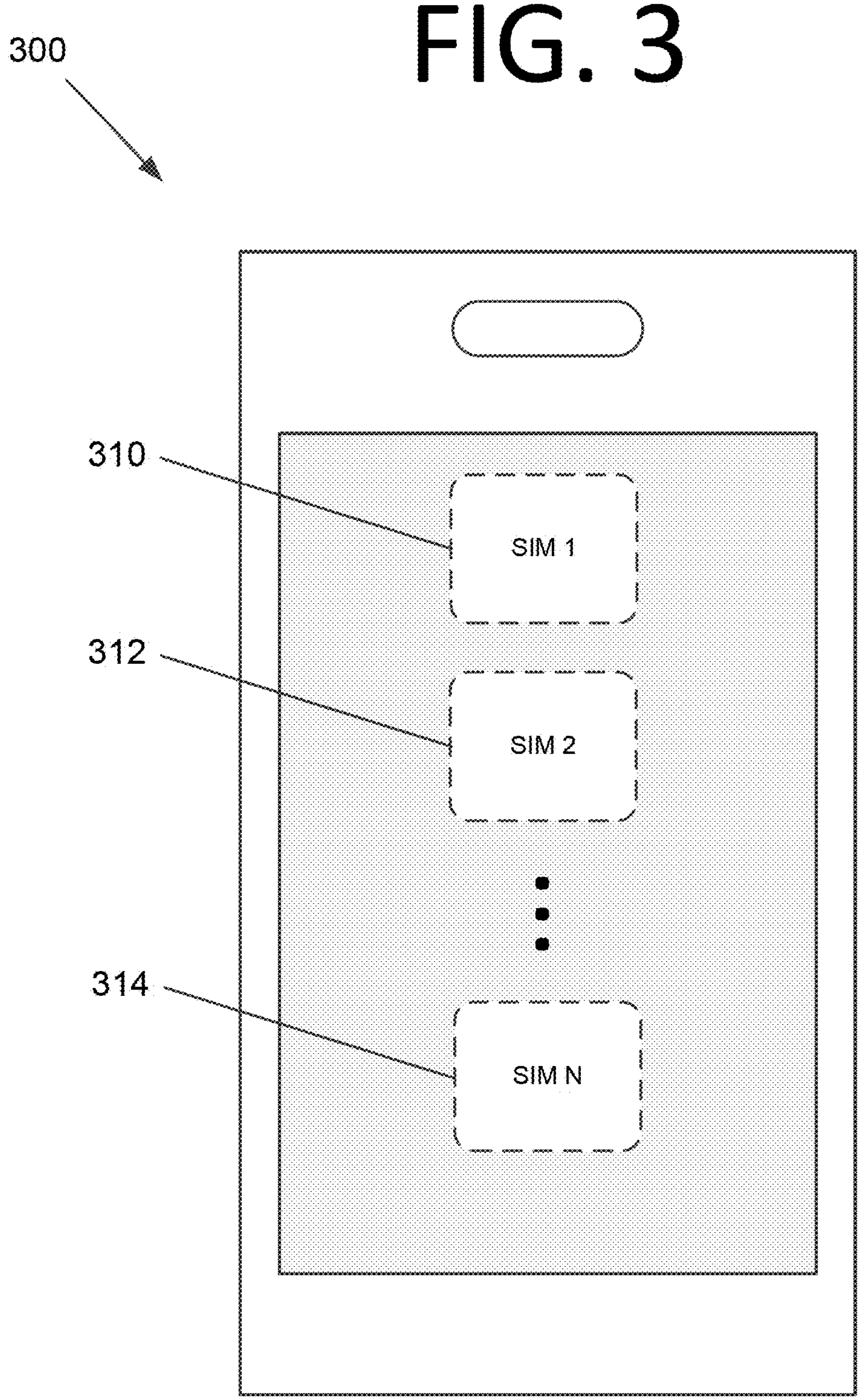
FIG. 3 illustrates a mobile device with multiple SIMs, according to an embodiment of the present invention.

FIG. 3 illustrates a mobile device 300 with multiple SIMs, according to an embodiment of the present invention. In some embodiments, mobile device 300 may be mobile device 110 of FIG. 1, mobile device 210 of FIG. 2, and/or computing system 1000 of FIG. 10. Mobile device 300 has N SIMs in this embodiment (i.e., SIM 1 310, SIM 2 312, . . . , SIM N 314). Each of SIMs 1 to N may be a physical SIM (pSIM) or an embedded SIM (eSIM) and is associated with a respective carrier. In some embodiments, a universal SIM may be used. In multi-SIM embodiments, such as DSDS, each SIM may be used for a different service. For instance, one SIM may be used for voice and SMS and another SIM may be used for data.

FIG. 4 is a flow diagram illustrating a process 400 for managing communications between a mobile device 405, a private core 415, and a carrier core 420, according to an embodiment of the present invention. In this example, a single private core 415 and carrier core 420 are available to mobile device 405 and accessible via respective RANs 410. However, any desired number of public cores and/or private cores may be used without deviating from the scope of the invention. Mobile device 405 is initially using carrier core 420 for communications in this example, although the reverse could be the case, or mobile device 405 may be using both cores simultaneously.

Mobile device 405 periodically polls private core 415 and carrier core 420 to determine the QoS provided by each. However, in some embodiments, private core 415 and/or carrier core 420 may not rely on mobile device 405 for polling purposes. Polling may be useful to provide the carrier with a picture of network characteristics in a given area.

Polling information regarding the QoS of each core is sent from mobile device 405 to carrier core 420. In this example, core determination and traffic balance is driven by carrier core 420. Carrier core 420 determines that private core 415 should be added to supplement the bandwidth available to mobile device 405. Carrier core 420 determines a portion of traffic that should flow to each of cores 415, 420 and instructs mobile device 405 to use private core 415 and carrier core 420 for their respective portions and/or to use a given core for a given application or application type. Mobile device 405 then implemented the traffic split between private core 415 and carrier core 420 and uses private core 415 and carrier core 420 accordingly. Mobile device 405 would be connected to both cores in this scenario so mobile device 405 does not need to attach to the networks associated with each core in order to switch cores and/or change core traffic balances for mobile device 405 and/or its application(s).

Figure 5:
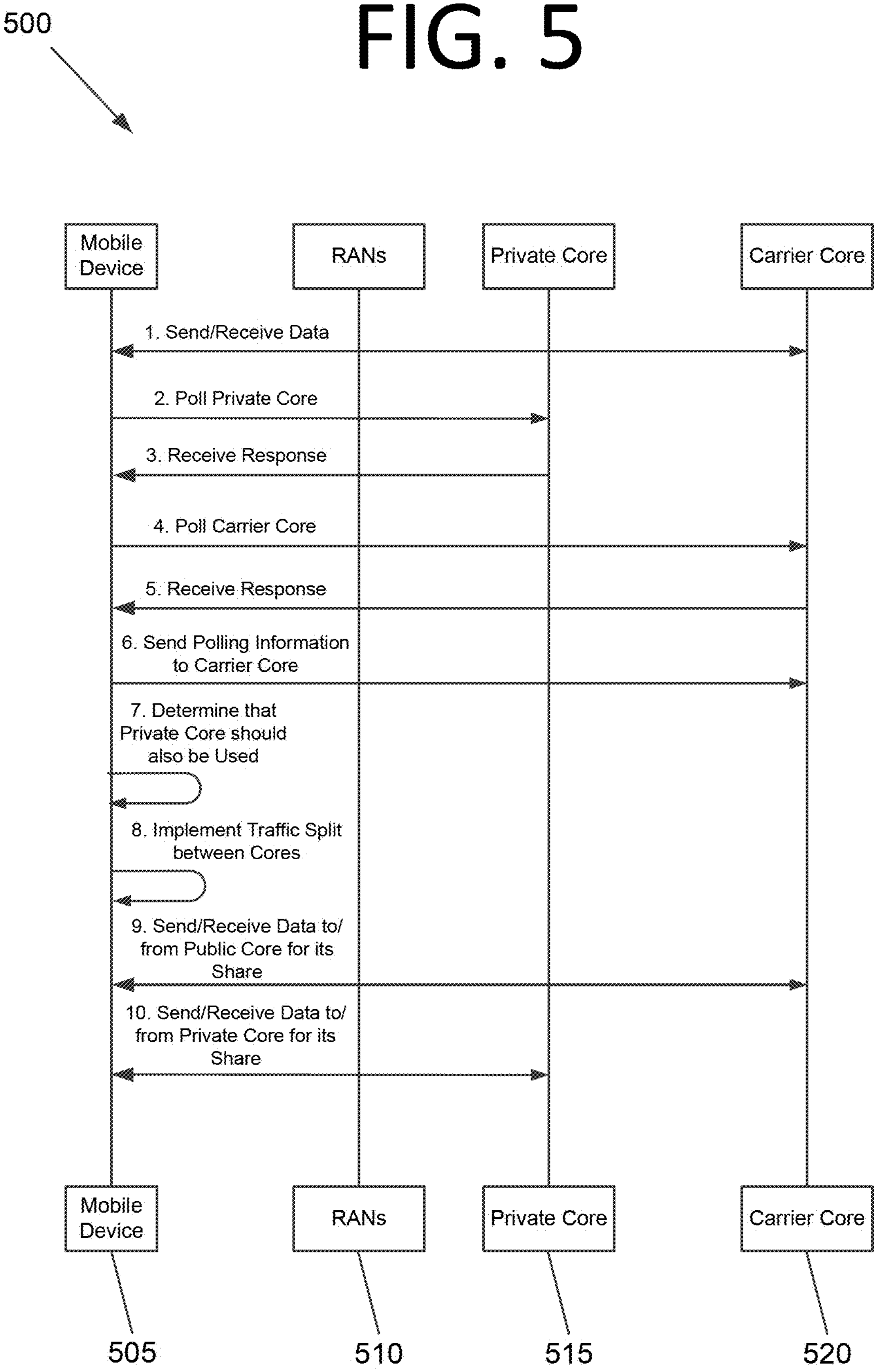
FIG. 5 is a flow diagram illustrating another process for managing communications between a mobile device, a private core, and a carrier core, according to an embodiment of the present invention.

FIG. 5 is a flow diagram illustrating another process 500 for managing communications between a mobile device 505, a private core 515, and a carrier core 520, according to an embodiment of the present invention. As with FIG. 4, in this example, a single private core 515 and carrier core 520 are available to mobile device 505 and accessible via respective RANs 510. However, any desired number of public cores and/or private cores may be used without deviating from the scope of the invention. Mobile device 505 is initially using carrier core 520 for communications in this example, although the reverse could be the case, or mobile device 505 may be using both cores simultaneously.

Mobile device 505 periodically polls private core 515 and carrier core 520 to determine the QoS provided by each. However, in some embodiments, private core 515 and/or carrier core 520 may not rely on mobile device 505 for polling purposes. Polling may be useful to provide the carrier with a picture of network characteristics in a given area.

Polling information regarding the QoS of each core is sent from mobile device 505 to carrier core 520. In this example, mobile device 405 determines which core(s) to use. Mobile device 505 determines that private core 515 should be added to supplement the bandwidth available to mobile device 505. Mobile device 505 may determine a portion of traffic that should flow to each of cores 515, 520 and distribute traffic accordingly. Alternatively, mobile device 505 may query private core 515 and/or carrier core 520 regarding which portions should be used (these cores will likely have a better view of the overall network congestion status than mobile device 505). Mobile device 505 then communicates with private core 515 and carrier core 520 accordingly. Mobile device 405 would be connected to both cores in this scenario so mobile device 405 does not need to attach to the networks associated with each core in order to switch cores and/or change core traffic balances for mobile device 405 and/or its application(s).

Figure 6:
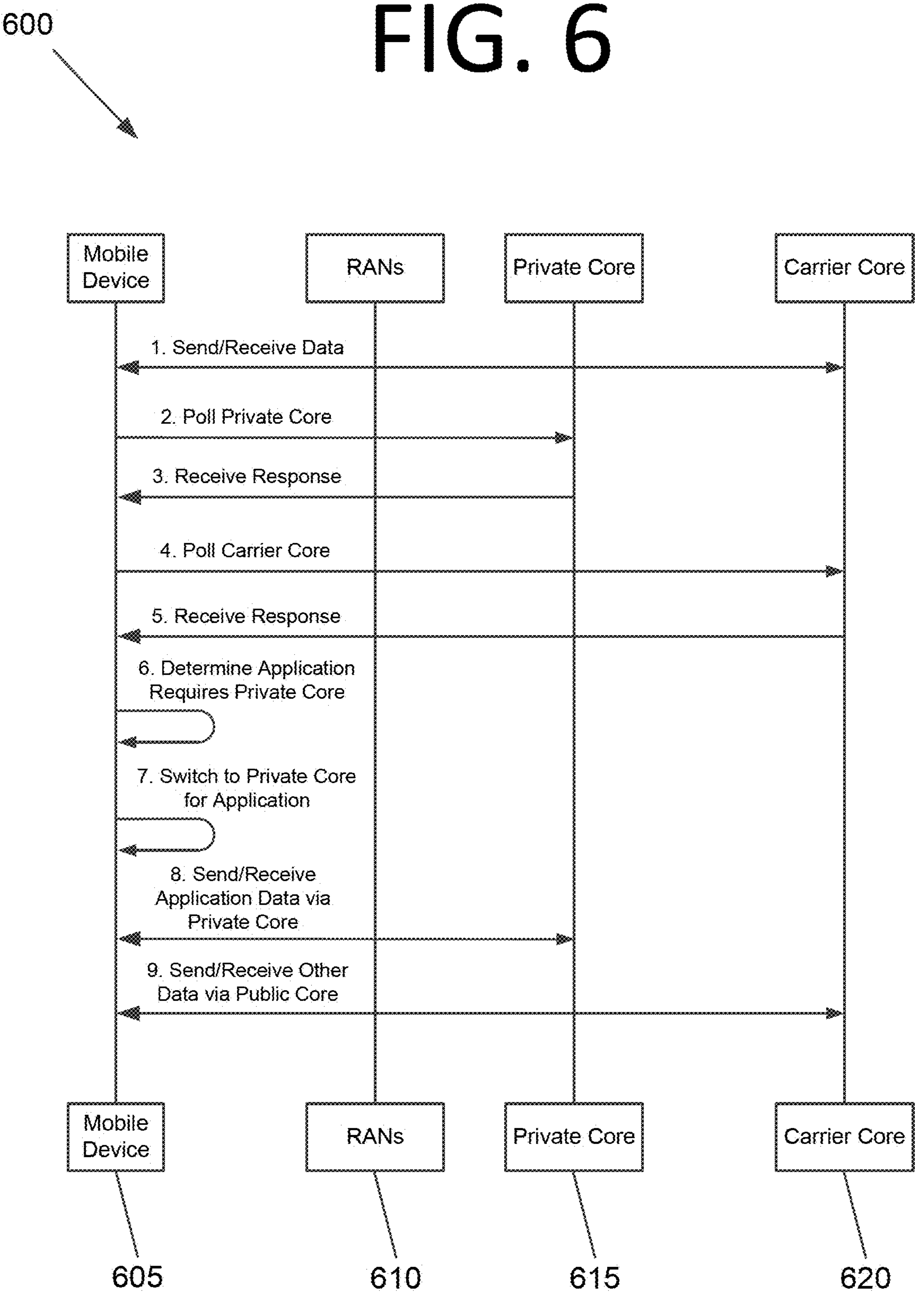
FIG. 6 is a flow diagram illustrating yet another process for managing communications between a mobile device, a private core, and a carrier core, according to an embodiment of the present invention.

FIG. 6 is a flow diagram illustrating yet another process 600 for managing communications between a mobile device 605, a private core 615, and a carrier core 620, according to an embodiment of the present invention. As with FIGS. 4 and 5, in this example, a single private core 615 and carrier core 620 are available to mobile device 605 and accessible via respective RANs 610. However, any desired number of public cores and/or private cores may be used without deviating from the scope of the invention. Mobile device 605 is initially using carrier core 620 for communications in this example, although the reverse could be the case, or mobile device 605 may be using both cores simultaneously.

Mobile device 605 periodically polls private core 615 and carrier core 620 to determine the QoS provided by each. However, in some embodiments, private core 615 and/or carrier core 620 may not rely on mobile device 605 for polling purposes. Polling may be useful to provide the carrier with a picture of network characteristics in a given area.

In this example, mobile device 605 determines that an application running on mobile device 605 requires private core 615 (e.g., for security reasons due to transmitting sensitive data, because the application is specific to the organization, etc.). Mobile device 605 then switches to communicating via private core 615 for this application. Mobile device 605 continues using carrier core 620 for other communications. In certain embodiments, mobile device 605 may use private core 615 for communications for the business or other organization and use public core 620 for other communications.

Figure 7:
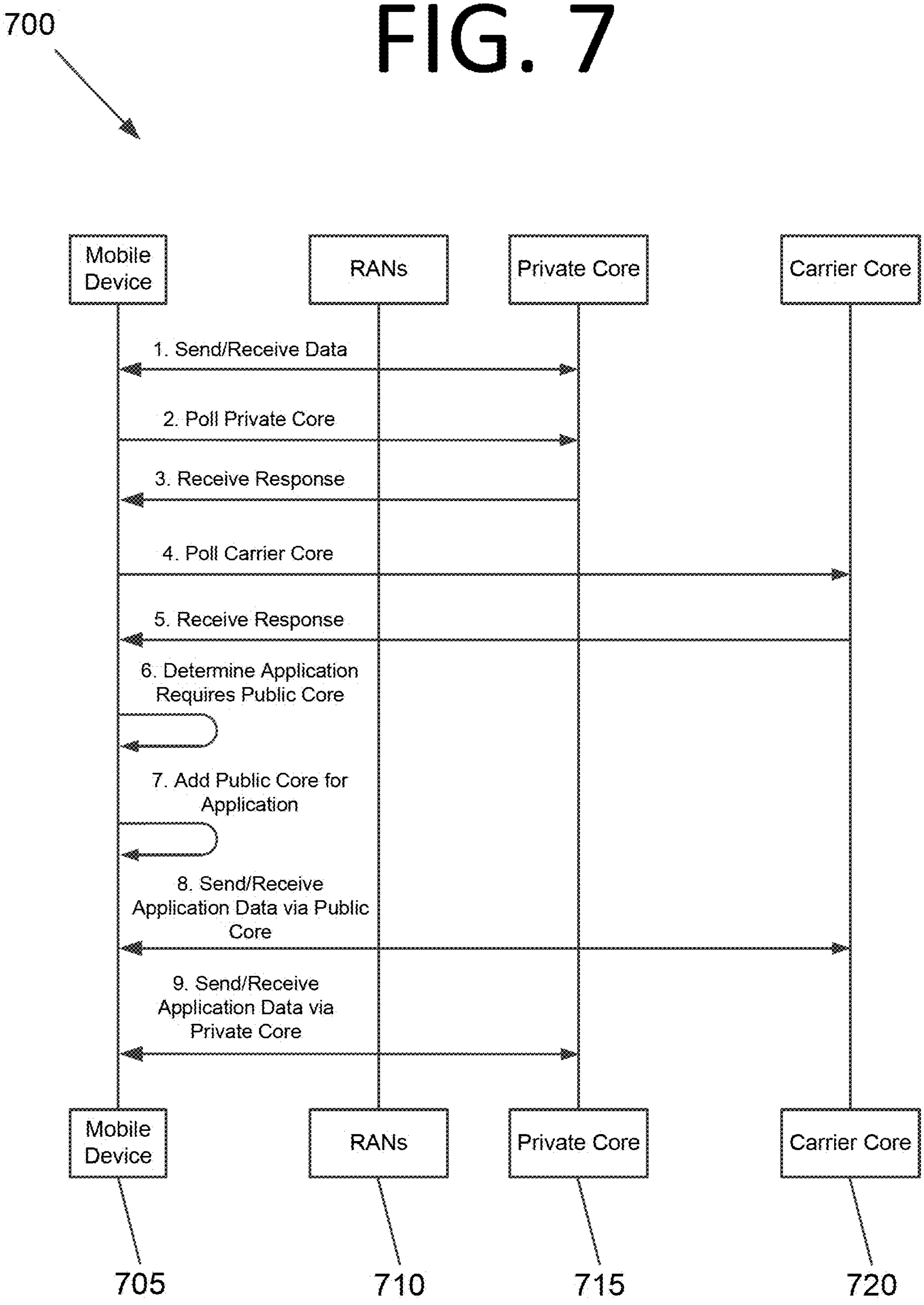
FIG. 7 is a flow diagram illustrating still another process for managing communications between a mobile device, a private core, and a carrier core, according to an embodiment of the present invention.

FIG. 7 is a flow diagram illustrating still another process 700 for managing communications between a mobile device 705, a private core 715, and a carrier core 720, according to an embodiment of the present invention. As with FIGS. 4-6, in this example, a single private core 715 and carrier core 720 are available to mobile device 705 and accessible via respective RANs 710. However, any desired number of public cores and/or private cores may be used without deviating from the scope of the invention. Mobile device 705 is initially using private core 715 for communications in this example, although the reverse could be the case, or mobile device 705 may be using both cores simultaneously.

Mobile device 705 periodically polls private core 715 and carrier core 720 to determine the QoS provided by each. However, in some embodiments, private core 615 and/or carrier core 620 may not rely on mobile device 605 for polling purposes. Polling may be useful to provide the carrier with a picture of network characteristics in a given area.

In this example, mobile device 705 determines that an application running on mobile device 705 requires the addition of carrier core 720 (e.g., due to high bandwidth requirements for the application). Mobile device 705 then switches to communicating via both private core 715 and carrier core 720 for this application. Mobile device 705 may continue using private core 715 for other communications. In certain embodiments, mobile device 705 may use private core 715 for communications for the business or other organization and use public core 720 for other communications.

Figure 8A:
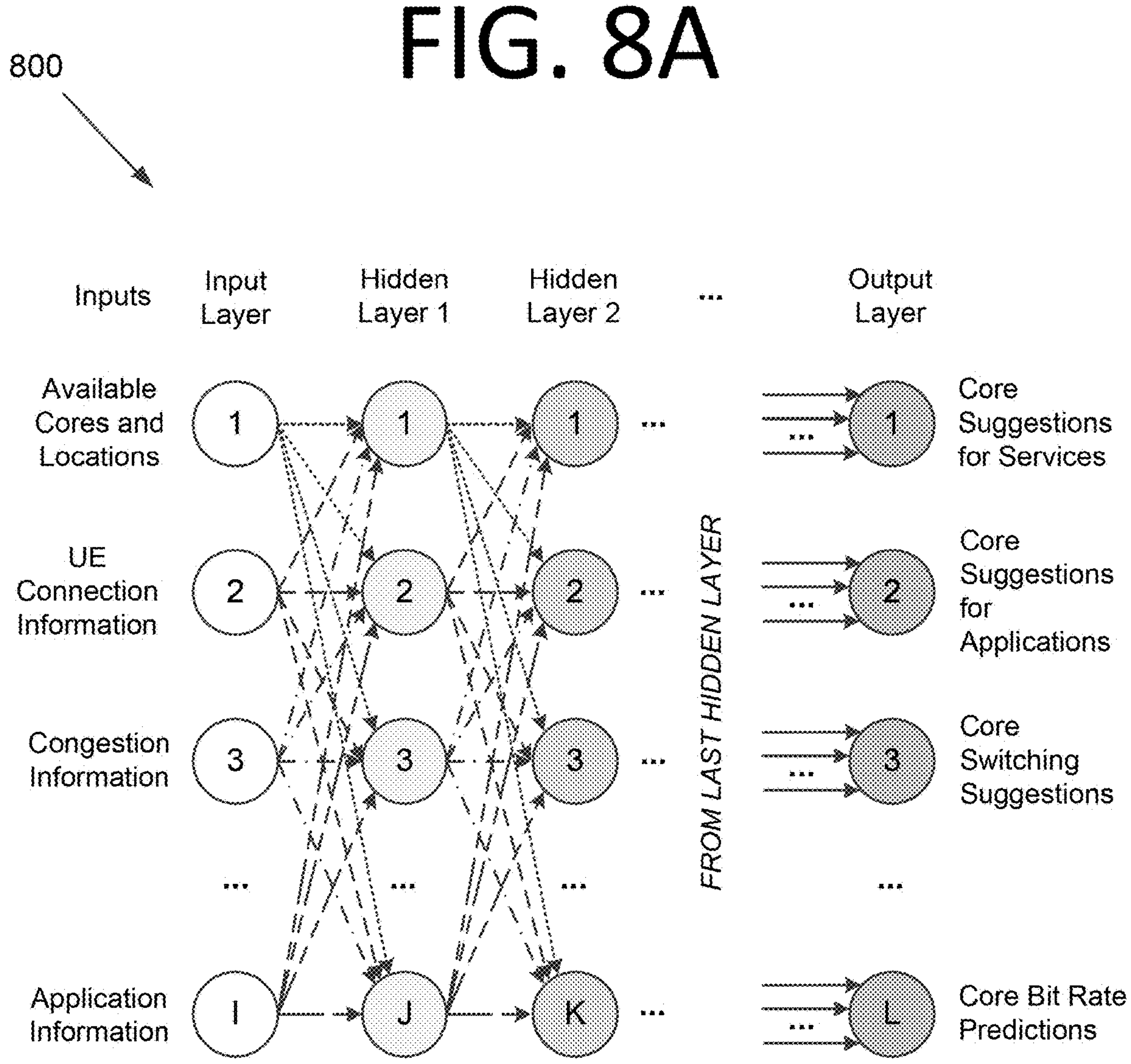
FIG. 8A illustrates an example of a neural network that has been trained to assist with tiered simultaneous core management, according to an embodiment of the present invention.

Per the above, AI/ML may be used for tiered simultaneous core management in some embodiments. Various types of AI/ML models may be trained and deployed without deviating from the scope of the invention. For instance, FIG. 8A illustrates an example of a neural network 800 that has been trained to assist with tiered simultaneous core management, according to an embodiment of the present invention.

Neural network 800 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 800.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 8A, available cores and locations, UE connection information, congestion information, application information (e.g., security requirements, bit rate requirements, etc.), etc. provided as the input layer are fed as inputs to the J neurons of hidden layer 1. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 800 without deviating from the scope of the invention. Indeed, in certain embodiments, the types of neurons in a given layer may not all be the same. For instance, convolutional neurons, recurrent neurons, and/or transformer neurons may be used.

Neural network 800 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 8B:
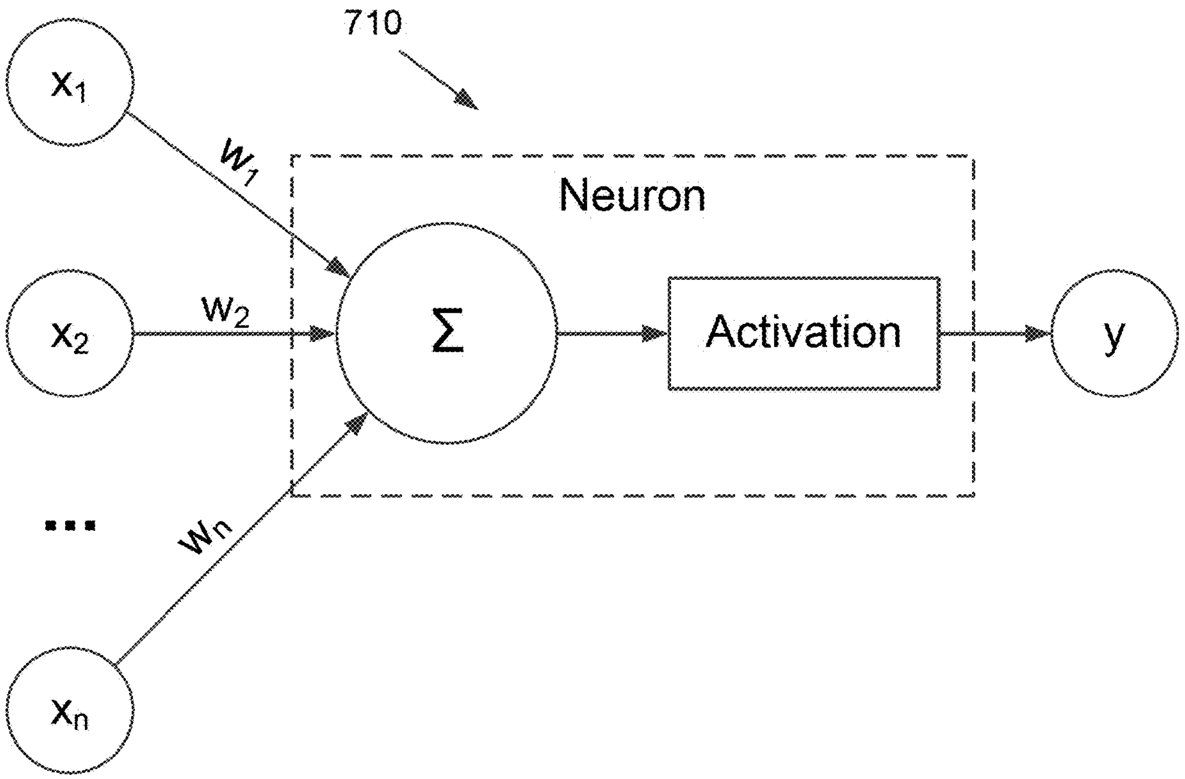
FIG. 8B illustrates an example of a neuron, according to an embodiment of the present invention.

An example of a neuron 810 is shown in FIG. 8B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_ix_i)+\text{bias} \tag{1}$$

This summation is compared against an activation function $f(x)$ to determine whether the neuron "fires". For instance, $f(x)$ may be given by:

$$f(x)=\begin{cases}1 \text{ if } \sum wx+\text{bias}\geq 0\\ 0 \text{ if } \sum wx+\text{bias}<0\end{cases} \tag{2}$$

The output y of neuron 810 may thus be given by:

$$y=f(x)\sum_{i=1}^{m}(w_ix_i)+\text{bias} \tag{3}$$

In this case, neuron 810 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the best core for a give service or application, determining when a network associated with a core is likely to be congested, etc.).

During training, various labeled data is fed through neural network 800. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $$p_j(n_j) = f_j'(n_j),$$

where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta \frac{\partial E}{\partial W_j} \tag{8}$$

$$b_j^{new} = b_j^{old} - \eta \frac{\partial E}{\partial b_j} \tag{9}$$

where $\circ$ denotes a Hadamard product (i.e., the element-wise product of two vectors), $^T$ denotes the matrix transpose, and $o_j$ denotes $f_j(W_j o_{j-1} + b_j)$, with $o_0 = x$. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to enable semantic understanding to better predict event-based congestion or service interruptions due to an accident, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, ChatGPT, etc. may be used in some embodiments to facilitate semantic understanding. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 9:
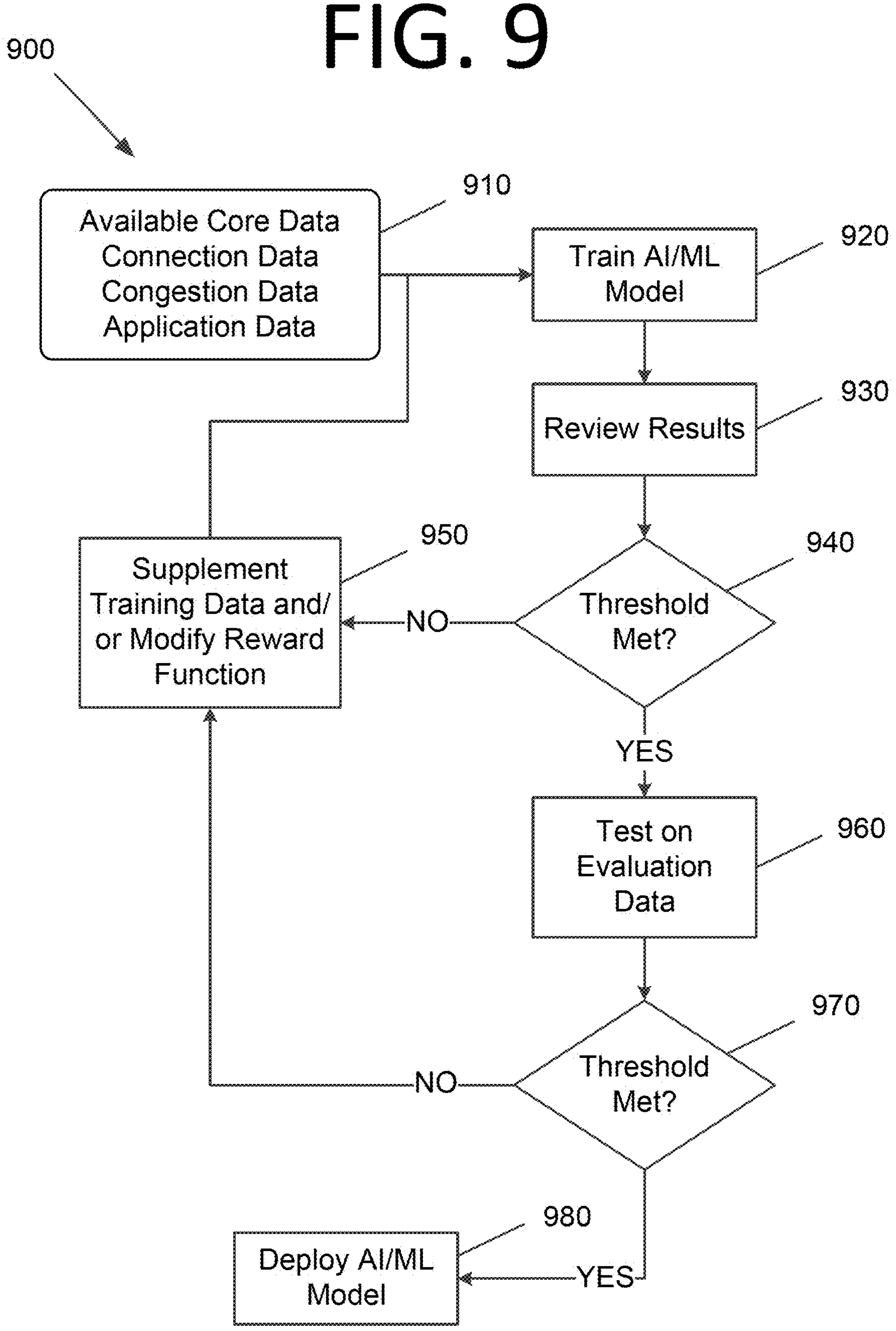
FIG. 9 is a flowchart illustrating a process for training AI/ML model(s), according to an embodiment of the present invention.

FIG. 9 is a flowchart illustrating a process 900 for training AI/ML model(s), according to an embodiment of the present invention. The process begins with providing available core data, connection data, congestion data, application data, etc. at 910, whether labeled or unlabeled. Other training data used in addition to or in lieu of the training data shown in FIG. 9. Indeed, the nature of the training data that is provided will depend on the objective that the AI/ML model is intended to achieve. The AI/ML model is then trained over multiple epochs at 920 and results are reviewed at 930.

If the AI/ML model fails to meet a desired confidence threshold at 940, the training data is supplemented and/or the reward function is modified to help the AI/ML model achieve its objectives better at 950 and the process returns to step 920. If the AI/ML model meets the confidence threshold at 940, the AI/ML model is tested on evaluation data at 960 to ensure that the AI/ML model generalizes well and that the AI/ML model is not over fit with respect to the training data. The evaluation data includes information that the AI/ML model has not processed before. If the confidence threshold is met at 970 for the evaluation data, the AI/ML model is deployed at 980. If not, the process returns to step 950 and the AI/ML model is trained further.

Figure 10:
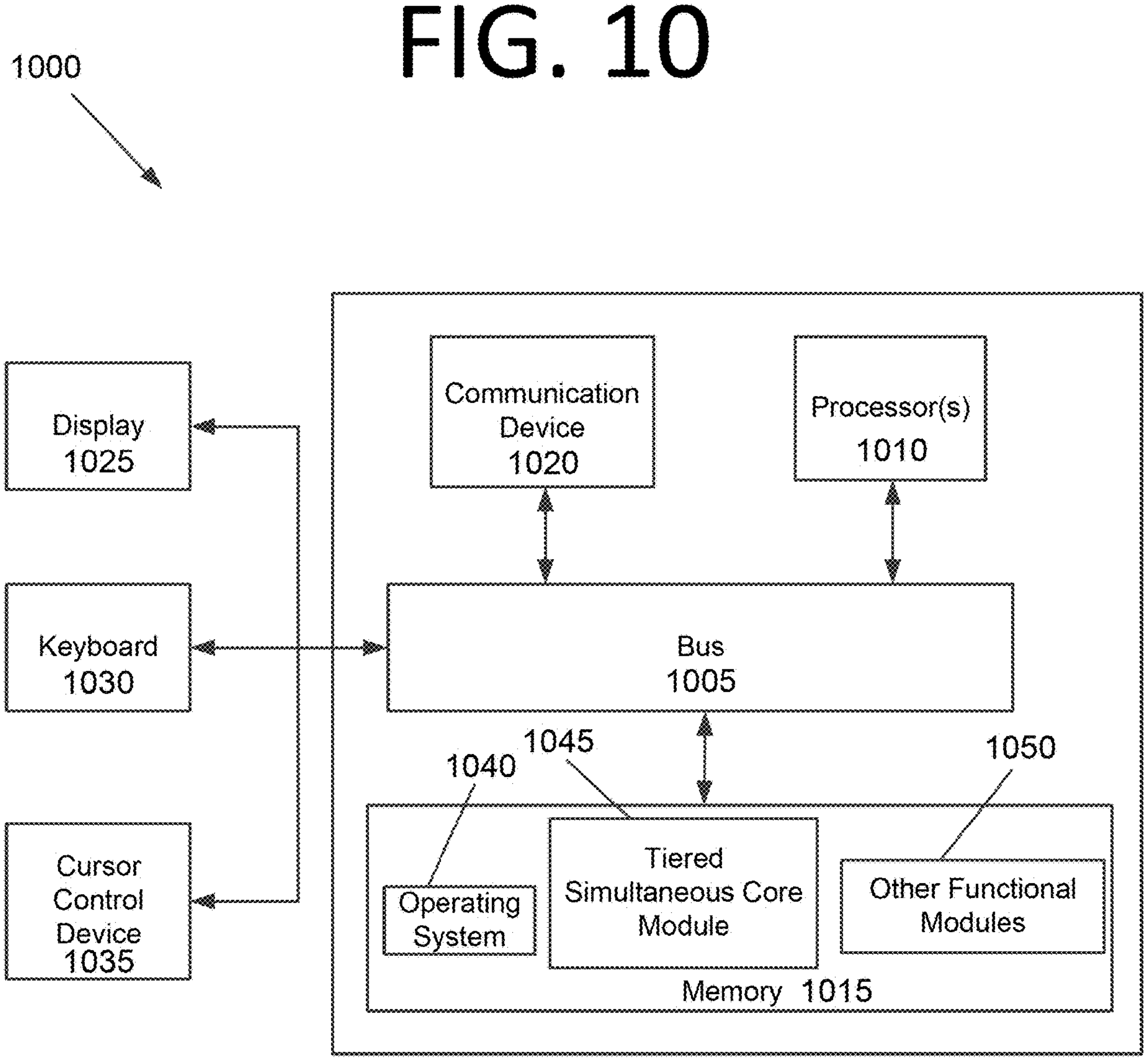
FIG. 10 is an architectural diagram illustrating a computing system configured for operation in a tiered simultaneous core system, according to an embodiment of the present invention.

FIG. 10 is an architectural diagram illustrating a computing system 1000 configured for operation in a tiered simultaneous core system, according to an embodiment of the present invention. In some embodiments, computing system 1000 may be one or more of the computing systems depicted and/or described herein, such as a mobile device, a private core server, a carrier server, a computing system of a RAN, etc. Computing system 1000 includes a bus 1005 or other communication mechanism for communicating information, and processor(s) 1010 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments. In certain embodiments, at least one of processor(s) 1010 may be a neuromorphic circuit that includes processing elements that mimic biological neurons. In some embodiments, neuromorphic circuits may not require the typical components of a Von Neumann computing architecture.

Computing system 1000 further includes a memory 1015 for storing information and instructions to be executed by processor(s) 1010. Memory 1015 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both.

Additionally, computing system 1000 includes a communication device 1020, such as a transceiver, to provide access to a communications network via a wireless and/or wired connection. In some embodiments, communication device 1020 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1020 may include one or more antennas that are singular, arrayed, phased, switched, beamforming, beamsteering, a combination thereof, and or any other antenna configuration without deviating from the scope of the invention.

Processor(s) 1010 are further coupled via bus 1005 to a display 1025, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1030 and a cursor control device 1035, such as a computer mouse, a touchpad, etc., are further coupled to bus 1005 to enable a user to interface with computing system 1000. However, in certain embodiments, a physical keyboard and mouse may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1040 for computing system 1000. The modules further include a tiered simultaneous core module 1045 that is configured to perform all or part of the processes described herein or derivatives thereof. Computing system 1000 may include one or more additional functional modules 1050 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 11:
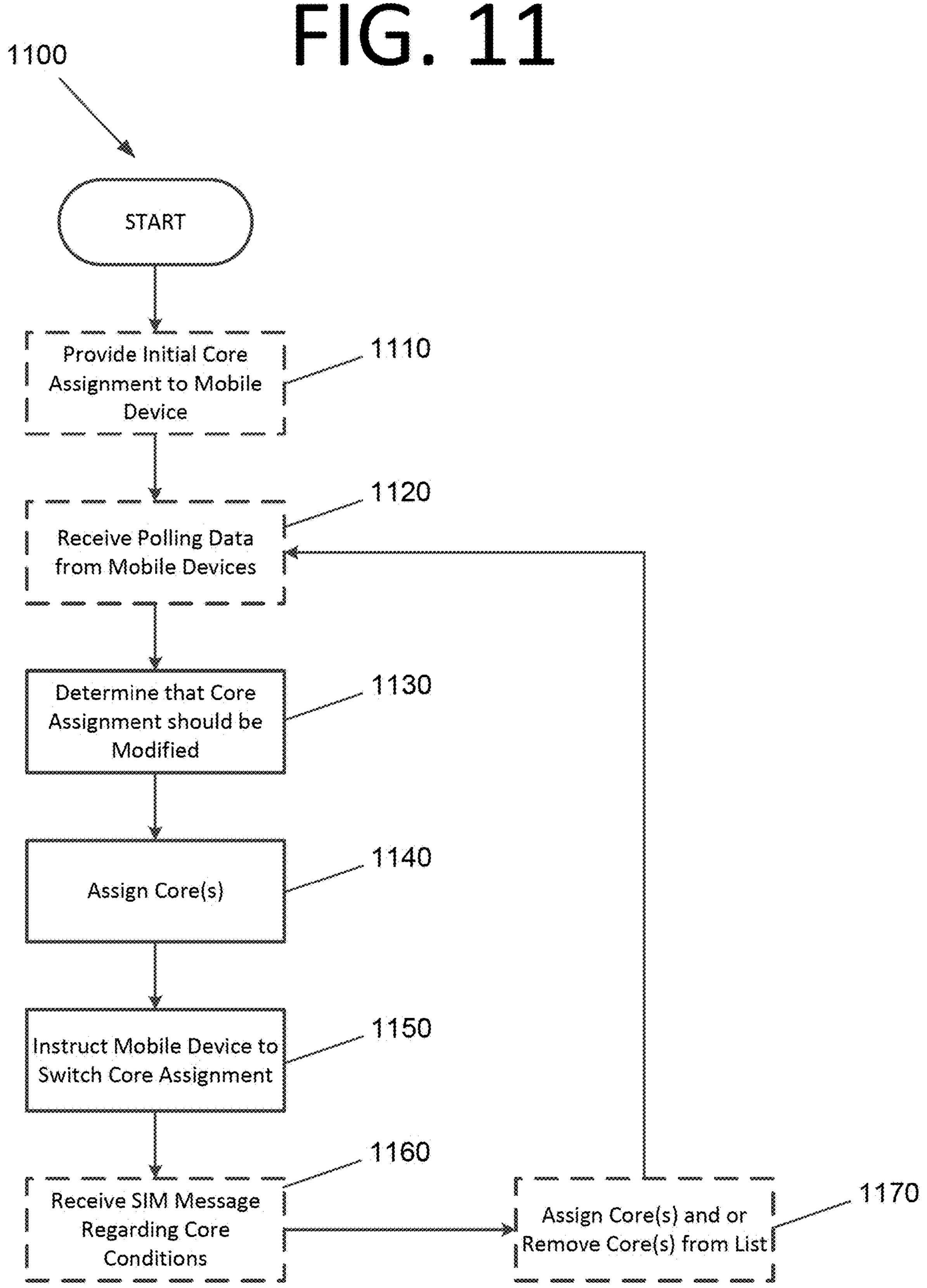
FIG. 11 is a flowchart illustrating a process for performing tiered simultaneous core management, according to an embodiment of the present invention.

FIG. 11 is a flowchart illustrating a process 1100 for performing tiered simultaneous core management, according to an embodiment of the present invention. In this embodiment, process 1100 is driven by server(s) of a carrier core or otherwise associated with the carrier network. The process may begin with providing an initial core assignment to a mobile device at 1110. For instance, the mobile device may be instructed to use one or more public and/or private cores for communications generally based on a service tier, instructed to used certain core(s) for certain application(s), etc. In some embodiments, the carrier network receives polling data for the cores from mobile devices at 1120. In certain embodiments, the polling data includes data pertaining to ping tests, signal strength analyses, or both.

The carrier network determines that a core assignment should be modified for a mobile device or an application running on the mobile device at 1130. The carrier network assigns one or more cores to the mobile device or the application at 1140 based on network characteristics of the available cores, a subscription of the mobile device, or both. In some embodiments, the assignment is made at least in part based on the polling data. The carrier network then instructs the mobile device to switch the core assignment for the application or the mobile device to the assigned core(s) at 1150. The core assignment is made based at least in part on a service tier associated with a user or entity of the mobile device, the application, a type of data transfer, or a priority.

In some embodiments, the core assignment is made based at least in part on capacity, bit rate, security, latency, location, throughput, call quality, or any combination thereof. In certain embodiments, enterprise applications are assigned to one or more private cores and non-enterprise applications are assigned to one or more public cores. In some embodiments, the core assignment is made based at least in part on minimum bandwidth requirements of the application. In certain embodiments, the core assignment is made at least in part using one or more AI/ML models that have been trained to learn network characteristics of the cores.

In some embodiments, the carrier network receives SIM messages from mobile devices regarding core conditions at 1160. The carrier network then assigns core(s) and instructs the mobile device accordingly or removes core(s) from a list of available cores at 1170 responsive to the SIM messages. The process then returns to step 1120.

Figure 12:
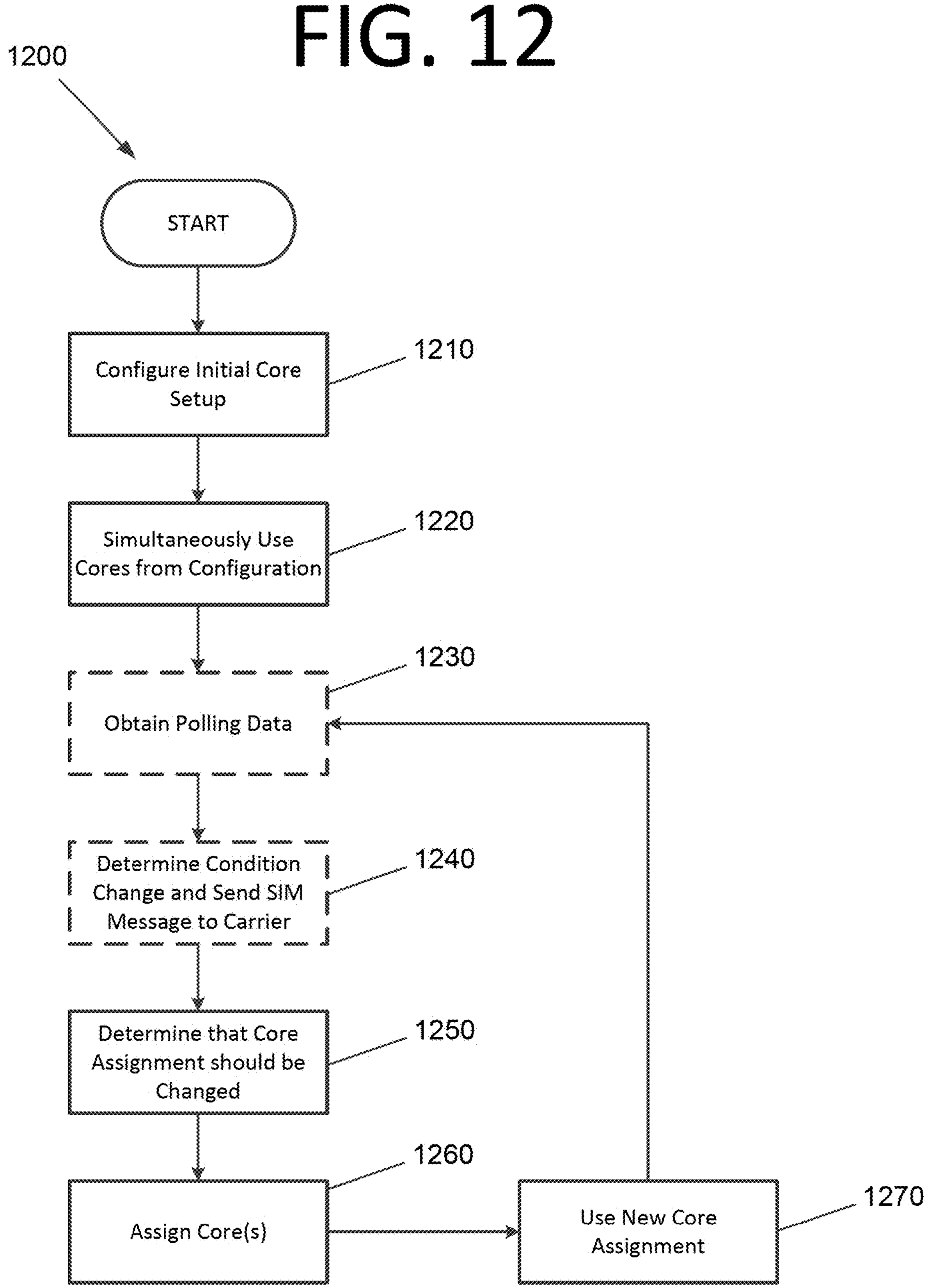
FIG. 12 is a flowchart illustrating another process for performing tiered simultaneous core management, according to an embodiment of the present invention.

FIG. 12 is a flowchart illustrating another process 1200 for performing tiered simultaneous core management, according to an embodiment of the present invention. In this embodiment, process 1200 is driven by a mobile device. The process begins with configuring the mobile device, an application running on the mobile device, or both, for a plurality of cores based at least in part on a service tier associated with a user or entity of the mobile device, the application, a type of data transfer, or a priority at 1210. The plurality of cores include one or more public cores, one or more private cores, or both. The mobile device then simultaneously uses the plurality of cores from the configuration at 1220.

In some embodiments, the mobile device obtains polling data from the plurality of cores at 1230. In some embodiments, the polling data includes data pertaining to ping tests, signal strength analyses, or both. In certain embodiments, the mobile device determines that network characteristics of a core of the plurality of cores have improved over time based on the polling data and sends a SIM message to a server of the carrier network responsive to the determination over a 5G band at 1240.

The mobile device determines that a core assignment for the mobile device or the application running on the mobile device should be modified from among the plurality of cores at 1250. The mobile device assigns one or more cores of the plurality of cores to the mobile device or the application at 1260. The assigned core(s) for communication by the mobile device or the application.

In some embodiments, the assignment of the one or more cores of the plurality of cores is made by the mobile device based at least in part on capacity, bit rate, security, latency, location, throughput, call quality, or any combination thereof. In certain embodiments, the assignment of the one or more cores of the plurality of cores is made by mobile device based at least in part on minimum bandwidth requirements of the application. In some embodiments, the assignment of the one or more cores of the plurality of cores is made at least in part by the mobile device using one or more AI/ML models that have been trained to learn network characteristics of the plurality of cores. In certain embodiments, the mobile device is configured to assign enterprise applications to one or more private cores of the plurality of cores and to assign non-enterprise applications to one or more public cores of the plurality of cores. In some embodiments, the mobile device is configured to use the obtained polling data at least in part for the assignment of the one or more cores of the plurality of cores.

In some embodiments, the process begins with using multiple cores at 1210. For instance, the mobile device may use multiple public cores, multiple private cores, or at least one public core and at least one private core simultaneously. In some embodiments, the mobile device uses a public core for a first application and a private core for a second application. When the mobile device is a DSDS device, the mobile device may use a first SIM for voice and SMS communications via a public core and to use a second SIM for data communications via a private core, or vice versa.

Polling data pertaining to one or more public cores and one or more private cores is obtained at 1220 and sent to one or more servers of a carrier network at 1230. In some embodiments, the polling data includes data pertaining to ping tests, signal strength analyses, data pertaining to all cores that the mobile device is connected to, data pertaining to a core of the one or more public cores or the one or more private cores that is no longer available to the mobile device, or any combination thereof. In some embodiments, the mobile device sends a SIM message from responsive to network characteristics of a polled core of the public core(s) private core(s) improving over time over a 5G band to one or more servers of the carrier network.

The mobile device determines that it should use a different core for communications for an application, or switch for other communications from a current core to a public core or a private core at 1250. In some embodiments, the determination is made based on capacity, bit rate, security, latency, location, throughput, call quality, or any combination thereof. In some embodiments, the determination to switch the mobile device to the public core of the one or more public cores or to the private core of the one or more private cores for the other communications is made using one or more AI/ML models that have been trained to learn network characteristics. The mobile device then uses the determined public core or the determined private core for the application or switches to the determined public core or the determined private core for the other communications at 1260.

The process steps performed in FIGS. 3-7, 11, and 12 may be performed by computer program(s), encoding instructions for the processor(s) to perform at least part of the process(es) described in FIGS. 3-7, 11, and 12, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 610 of computing system 1000 of FIG. 10) to implement all or part of the process steps described in FIGS. 3-7, 11, and 12, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more servers of a public core, comprising:
- memory storing computer program instructions for tiered simultaneous core management for mobile devices; and
- at least one processor configured to execute the computer program instructions, wherein the computer program instructions are configured to cause the at least one processor to:
  - determine that a core assignment for a mobile device or an application running on the mobile device should be modified from among a plurality of cores, the plurality of cores comprising one or more public cores, one or more private cores, or both,
  - assign both one or more private cores and one or more public cores of the plurality of cores to the mobile device or the application based on network characteristics of the plurality of cores, a subscription of the mobile device, or both, wherein the assignment comprises determining respective portions of traffic for the mobile device or the application to be communicated through the assigned one or more private cores and the assigned one or more public cores simultaneously, and
  - instruct the mobile device to implement a traffic split for the application or the mobile device between the assigned one or more private cores and the assigned one or more public cores based on the determined respective portions, wherein
  - the assignment of both the one or more private cores and the one or more public cores is made by the one or more servers based at least in part on a service tier associated with a user or entity of the mobile device, the application, a type of data transfer, or a priority.

2. The one or more servers of the public core of claim 1, wherein the assignment of the one or more cores of the plurality of cores is made by the one or more servers based at least in part on capacity, bit rate, security, latency, location, throughput, call quality, or any combination thereof.

3. The one or more servers of the public core of claim 1, wherein
- the one or more servers are configured to assign enterprise applications to one or more private cores of the plurality of cores,
- the one or more servers are configured to assign non-enterprise applications to one or more public cores of the plurality of cores, and
- the assignment of the one or more cores of the plurality of cores is made by the one or more servers based at least in part on whether the application is an enterprise application or a non-enterprise application.

4. The one or more servers of the public core of claim 1, wherein the assignment of the one or more cores of the plurality of cores is made by the one or more servers based at least in part on minimum bandwidth requirements of the application.

5. The one or more servers of the public core of claim 1, wherein the computer program instructions are further configured to cause the at least one processor to:
- receive a subscriber identity module (SIM) message from the mobile device responsive to network characteristics of a polled core of the plurality of cores improving over time over a 5G band; and
- assign the one or more cores of the plurality of cores responsive at least in part to the received SIM message.

6. The one or more servers of the public core of claim 1, wherein the assignment of the one or more cores of the plurality of cores is made at least in part by the one or more servers using one or more AI/ML models that have been trained to learn network characteristics of the plurality of cores.

7. The one or more servers of the public core of claim 1, wherein the computer program instructions are further configured to cause the at least one processor to:
- receive polling data from the mobile device pertaining to the one or more public cores and the one or more private cores; and
- use the received polling data at least in part for the assignment.

8. The one or more servers of the public core of claim 7, wherein the polling data comprises data pertaining to a core of the plurality of cores that is no longer available to the mobile device and the computer program instructions are further configured to cause the at least one processor to:
- remove the core that is no longer available from a list of cores that the mobile device or the application can be assigned to.

9. The one or more servers of the public core of claim 7, wherein the polling data comprises data pertaining to ping tests, signal strength analyses, or both.

10. One or more non-transitory computer-readable media storing one or more computer programs for tiered simultaneous core management for mobile devices, the one or more computer programs configured to cause at least one processor to:
- determine that a core assignment for a mobile device or an application running on the mobile device should be modified from among a plurality of cores, the plurality of cores comprising one or more public cores, one or more private cores, or both,
- assign both one or more private cores and one or more public cores of the plurality of cores to the mobile device or the application based on network characteristics of the plurality of cores, a subscription of the mobile device, or both, wherein the assignment comprises determining respective portions of traffic for the mobile device or the application to be communicated through the assigned one or more private cores and the assigned one or more public cores simultaneously, and
- instruct the mobile device to implement a traffic split for the application or the mobile device between the assigned one or more private cores and the assigned one or more public cores based on the determined respective portions, wherein
- the assignment of both the one or more private cores and the one or more public cores is made based at least in part on a service tier associated with a user or entity of the mobile device, the application, a type of data transfer, or a priority.

11. The one or more non-transitory computer-readable media of claim 10, wherein the assignment of the one or more cores of the plurality of cores is made based at least in part on capacity, bit rate, security, latency, location, throughput, call quality, or any combination thereof.

12. The one or more non-transitory computer-readable media of claim 10, wherein the one or more computer programs are configured to assign enterprise applications to one or more private cores of the plurality of cores, the one or more computer programs are configured to assign non-enterprise applications to one or more public cores of the plurality of cores, and the assignment of the one or more cores of the plurality of cores is made by the one or more computer programs based at least in part on whether the application is an enterprise application or a non-enterprise application.

13. The one or more non-transitory computer-readable media of claim 10, wherein the assignment of the one or more cores of the plurality of cores is made by the one or more computer programs based at least in part on minimum bandwidth requirements of the application.

14. The one or more non-transitory computer-readable media of claim 10, wherein the one or more computer programs are further configured to cause the at least one processor to:

receive a subscriber identity module (SIM) message from the mobile device responsive to network characteristics of a polled core of the plurality of cores improving over time over a 5G band; and assign the one or more cores of the plurality of cores at least in part responsive to the received SIM message.

15. The one or more non-transitory computer-readable media of claim 10, wherein the assignment of the one or more cores of the plurality of cores is made by the one or more computer programs at least in part using one or more AI/ML models that have been trained to learn network characteristics of the plurality of cores.

16. The one or more non-transitory computer-readable media of claim 10, wherein the one or more computer programs are further configured to cause the at least one processor to:

receive polling data from the mobile device pertaining to the one or more public cores and the one or more private cores; and use the received polling data at least in part for the assignment, wherein the polling data comprises data pertaining to ping tests, signal strength analyses, or both.

17. The one or more non-transitory computer-readable media of claim 16, wherein the polling data comprises data pertaining to a core of the plurality of cores that is no longer available to the mobile device and the one or more computer programs are further configured to cause the at least one processor to:

remove the core that is no longer available from a list of cores that the mobile device or the application can be assigned to.

18. A computer-implemented method for performing tiered simultaneous core management for mobile devices, comprising:

determining, by one or more servers, that a core assignment for a mobile device or an application running on the mobile device should be modified from among a plurality of cores, the plurality of cores comprising one or more public cores, one or more private cores, or both;

assigning both one or more private cores and one or more public cores of the plurality of cores to the mobile device or the application, by one or more servers, based on network characteristics of the plurality of cores, a subscription of the mobile device, or both, wherein the assignment comprises determining respective portions of traffic for the mobile device or the application to be communicated through the assigned one or more private cores and the assigned one or more public cores simultaneously; and instructing the mobile device, by one or more servers, to implement a traffic split for the application or the mobile device between the assigned one or more private cores and the assigned one or more public cores based on the determined respective portions, wherein the assignment of both the one or more private cores and the one or more public cores is made by the one or more servers based at least in part on a service tier associated with a user or entity of the mobile device, the application, a type of data transfer, or a priority, and the assignment of the one or more cores of the plurality of cores is made by the one or more servers using one or more AI/ML models that have been trained to learn network characteristics of the plurality of cores.

19. The computer-implemented method of claim 18, wherein the one or more servers are configured to assign enterprise applications to one or more private cores of the plurality of cores, the one or more servers are configured to assign non-enterprise applications to one or more public cores of the plurality of cores, and the assignment of the one or more cores of the plurality of cores is made by the one or more servers based on whether the application is an enterprise application or a non-enterprise application.

20. The computer-implemented method of claim 18, further comprising:

receiving polling data from the mobile device pertaining to the one or more public cores and the one or more private cores, by the one or more servers; and using the received polling data at least in part for the assignment, by the one or more servers, wherein the polling data comprises data pertaining to ping tests, signal strength analyses, or both.

* * * * *